Patented Mar. 13, 1934

1,950,433

UNITED STATES PATENT OFFICE 1,950,433

BROMO BUTADIENE POLYMERS AND METHOD OF PRODUCING SAME

Wallace H. Carothers and Arnold M. Collins, Wilmington, Del., assignors to E. I. du Pont de Nemours & Company, Wilmington, Del., a corporation of Delaware No Drawing. Application May 14, 1931, Serial No. 537,492

20 Claims. (Cl. 260—6)

This invention relates to a new class of organic compounds and to the method of their preparation. More particularly it relates to polymers obtained from bromo-2-butadiene-1,3.

Prior art

It has been disclosed in a pending application of Carothers and Collins, Serial No. 490,538, filed October 22, 1930, that monovinylacetylene having the formula $(H)_2C=(H)C-C=C(H)$, will react with hydrobromic acid to yield an addition product having the formula $(H)_2C=(H)C-C(Br)=C(H)_2$ and termed bromo-2-butadiene-1,3. This reaction will take place under a variety of conditions.

One preferred method of preparing bromo-2-butadiene-1,3 is illustrated in the following example:

Example A

Fifty-two grams of monovinylacetylene is placed in a pressure bottle together with 185 cc. of concentrated hydrobromic acid (approximately 11 normal) and 35 g. of cuprous bromide, and the bottle is closed and shaken vigorously for six hours or longer. The aqueous solution is then separated from the oily layer and the latter is washed with water, stabilized with catechol, and distilled preferably under diminished pressure in a current of nitrogen or carbon dioxide. The fractions collected are: bromo-2-butadiene-1,3 boiling at 38–40° C. at 155–165 mm. (about 32 g.), and dibromobutene boiling at 88–92° C. at 56–60 mm. (about 48 g.). Each of these fractions may be purified further by redistillation.

Agents suitable for stabilizing the addition products of monovinylacetylene and hydrobromic acid may be present during the reaction or added subsequently. Such agents are exemplified by inhibitors, such as catechol as in the above Example A, hydroquinone, pyrogallol, trinitrobenzene, iodine, diphenyl guanidine, m-toluylenediamine, as described fully in the Carothers and Collins application referred to above.

Object of invention

In accordance with the teachings of the present invention, it has been found that bromo-2-butadiene-1,3 may be readily polymerized under a wide variety of conditions with the production of novel and useful products.

An object of this invention, therefore, pertains to the polymerization of bromo-2-butadiene-1,3. A further object relates to the preparation of new and useful materials, and particularly to the preparation of strong, tough, elastic masses, resistant to the action of solvents and chemical agents generally, and resembling vulcanized natural rubber.

The mode of effecting the polymerization of bromo-2-butadiene-1,3 is capable of a considerable variation due to the number of conditions which may influence the polymerization, and the resulting polymers likewise have widely varying characteristics. One method of effecting the polymerization is illustrated as follows:

Example I

A sample of bromo-2-butadiene-1,3, freed by distillation of any impurities which might have an inhibiting effect on the course of the reaction is placed in a closed vessel containing a small amount of air (about 5% by volume) and the vessel is allowed to stand at 25° C. and atmospheric pressure in the absence of direct light. Under these conditions, the bromo-butadiene, which is at first a moderately heavy, mobile, pale yellow liquid gradually changes in consistency. After 12 to 15 hours, it has become much more viscous; later it sets to a sticky jelly, and finally, after about 10 days, it is converted to a dark, opaque, strong, tough mass, having a certain amount of elasticity and bearing a resemblance to vulcanized natural rubber. A typical specimen of this product was shown to have a specific gravity of 1.74.

As indicated in Example I, there is a continuous change in the properties of the material undergoing polymerization until the polymerization has become complete. The special properties of the intermediate, incompletely polymerized mixtures sometimes make advisable their use as such, either in the state of viscous liquids, or in the state of sticky or plastic polymers, with or without the removal of the unpolymerized bromo-butadiene.

For example, soluble and plastic products are readily obtained by interrupting the polymerization when the product is in the form of a viscous liquid or a soft jelly and separating the unchanged bromo-butadiene from its polymer. This separation may be effected by allowing the unchanged bromo-butadiene to evaporate or distill, or by precipitating the polymer with the aid of some solvent such as alcohol or acetone which is capable of dissolving the bromo-butadiene but not its polymer, or the separation may be effected by other suitable means. The polymer thus obtained can be mixed with pigments, dyes, fillers, stabilizers, vulcanizing agents, etc., and either with or without such additions it can be molded. A particularly desirable modifying agent is zinc oxide. The polymerization can then be caused to proceed to completion by the action of heat to yield a finished article in the form of a tough, elastic, insoluble, non-plastic mass. The plastic, soluble polymers isolated by the methods indicated above from incompletely polymerized bromo-butadiene may also be dissolved in suitable solvents such as toluene, chloroform, trichloroethylene, etc. to produce solutions suitable for use as coating and impregnating agents, and as cements.

The polymerization of bromo-2-butadiene-1,3 is greatly affected by the presence of oxygen, the rate of polymerization increasing upon exposure to an increased amount and concentration of oxygen. Thus the rate of polymerization is greater under an atmosphere of oxygen than under an atmosphere of air, other conditions being the same. The rate of surface to volume when the bromo-butadiene is exposed to oxygen has a direct bearing on the rate of polymerization, a greater proportionate amount of exposed surface causing an increase in the rate of polymerization.

Certain oxidizing catalysts markedly increase the rate of polymerization, and the rate will, in general, be proportional to the quantity of catalyst present, the quantity of any particular catalyst necessary to produce a given rate of polymerization being easily determined by experiment. The following peroxides have been found to be adaptable for increasing the rate of polymerization: benzoyl peroxide, oxidized turpentine, and inorganic peroxides such as those of sodium, lead, and hydrogen.

The effect of light on the polymerization rate is similar to that of oxygen. Hence exposure to direct light, particularly ultraviolet light and the shorter light waves of the visible spectrum, greatly increases the rate of polymerization, the intensity of the light, and the ratio of exposed surface to volume directly affecting the polymerization.

Elevated temperature and increased pressure likewise accelerate polymerization of bromobutadiene, with an accompanying effect on the character of the product. All of the conditions which affect the rate of polymerization, at the same time affect many of the characteristics of the product, e. g., its color, density, hardness, strength, elasticity, plasticity, etc., and the conditions under which polymerization is to take place must be controlled according to the product desired, as well as with respect to the optimum rate of polymerization.

The rate of polymerization may be reduced by working at low temperatures or by the addition of solvents or diluents, or of inhibitors of polymerization, examples of which are given below. As in the case of conditions which accelerate polymerization, these methods which retard polymerization also influence the course of the reaction and the nature of the products obtained. Thus solvents, diluents, and inhibitors are particularly useful in controlling the reaction so as to prevent or reduce the formation of the insoluble, completely polymerized products and increase the yield of the plastic, soluble polymers.

As solvents or diluents, we may use a wide variety of organic compounds, including, as shown below, hydrocarbons, halogenated hydrocarbons, alcohols, ethers, and esters. These solvents and diluents may be conveniently classified as follows:

(1) Volatile solvents for both bromo-2-butadiene-1,3 and its polymers, such as benzene, xylene, carbon disulfide and carbon tetrachloride. These give rise to more or less viscous solutions of bromo-2-butadiene-1,3 polymers which may be used directly as coating compositions, cements, and impregnating agents, with or without incorporation of pigments, dyes, fillers, and other modifying agents. On removal of the volatile solvent, a plastic polymer of bromo-2-butadiene-1,3 remains. If desired, this may be further polymerized to an insoluble form by the action of heat.

(2) Non-volatile or high-boiling solvents or diluents such as refined mineral oil, diphenyl ether, linseed oil, and tricresyl phosphate. These substances remain with the bromo-2-butadiene-1,3 after its polymerization, forming, in general, plastic, homogeneous, soluble masses. The non-volatile solvent or diluent often functions as a softener for the polymer yielding products which are more plastic and more pliable than the pure polymers.

(3) Solvents for bromo-2-butadiene-1,3 which are themselves capable of polymerization, for example isoprene and styrene. These substances may react under the conditions used for the polymerization of the bromo-2-butadiene-1,3 either by normal polymerization or by so-called cross polymerization with the bromo-2-butadiene-1,3 in which molecules of the latter combine with molecules of the polymerizable solvent with the formation of complex substances of high molecular weight.

(4) Solvents for bromo-2-butadiene-1,3 which are non-solvents for its polymers, for example ethyl alcohol. When such solutions of the monomer are polymerized, the polymer separates as soon as formed and is particularly light in color and free from odor.

The polymerization of these solutions may be brought about by any of the methods already described for the polymerization of bromo-2-butadiene-1,3. The concentration of the solutions may be varied over wide limits. A 50% solution is suitable for most purposes, although the concentration of the bromo-2-butadiene-1,3 may be varied from 5–95% without losing the desirable effect of the use of the solvent or diluent.

As inhibitors, compounds of a widely different type may be used as, for example, phenols, quinones, amines, aromatic nitro compounds, organic sulfur compounds, such as mercaptans and thio ethers, and free halogens. Polyhydric phenols, such as hydroquinone and pyrogallol are among the most active of these inhibitors. Saturation of bromo-2-butadiene-1,3 with one of this group at room temperature, substantially prevents its polymerization for long periods of time under ordinary conditions and in the absence of large amounts of oxygen. Hence they are useful for preserving bromo-2-butadiene-1,3 in the unpolymerized state or for arresting its polymerization when only partly complete. Other inhibitors, such as iodine and trinitrobenzene, retard the polymerization without entirely preventing it. They are useful in controlling the polymerization, and especially in retarding the formation of the insoluble polymers and hence increasing the yield of the soluble, plastic type. For this purpose, they are ordinarily used in amounts ranging from 0.1–1.0%. Very small amounts of the more active inhibitors also have the same effect. Since the modification of the properties of the polymers rather than a decrease in the rate of polymerization is in many cases the primary object in the use of inhibitors, it is often desirable to accelerate the polymerization in the presence of inhibitors by the application of heat, pressure, light, etc. Furthermore, it is often advantageous to polymerize in the presence of both solvents and inhibitors.

The plastic polymers prepared in the presence of solvents and/or inhibitors resemble the plastic products obtained above by arresting the polymerization of bromo-2-butadiene-1,3 before formation of substantial amounts of the insoluble elastic polymer. They can, therefore, be used in much the same way as natural unvulcanized rubber. For example, fillers, pigments, dyes, and other compounding ingredients known to the rubber art may be incorporated by milling or otherwise, and the resulting masses molded into any desired shape, and finally further polymerized to form products resembling compounded vulcanized natural rubber. Or, alternatively, the plastic polymers may be dissolved in rubber solvents such as benzene and used as coating compositions, cements, or impregnating agents, with or without the incorporation of pigments, dyes, fillers, and other modifying agents.

It has been found that the polymerization of bromo-2-butadiene-1,3 can be effected with particular facility when it is suspended in water in the form of an aqueous emulsion. Such emulsions are readily prepared by stirring together or homogenizing water and bromo-2-butadiene-1,3 in the desired proportions in the presence of a suitable emulsifying agent, for example, sodium oleate.

The following example illustrates the polymerization of bromo-2-butadiene-1,3 in aqueous emulsion:

Example II

One volume of bromo-2-butadiene-1,3 is emulsified by stirring it with one volume of a 2% aqueous suspension of sodium oleate containing 1% of its weight of catechol. After three days standing at ordinary temperature, the emulsion is completely polymerized yielding a white, milk-like liquid containing the polymer in suspension and resembling natural latex. When the emulsion is spread out in a thin layer on a plate of porous porcelain, the water evaporates and there remains an opaque, cream-colored, strong, tough, flexible, somewhat elastic film or sheet. It has a very smooth, soft surface, and undergoes no change in properties on being freely exposed to the air for one month. The polymerization of such an emulsion in the absence of the catechol is much more rapid and the product is harder. In any case the synthetic latex may be protected against spontaneous coagulation by making it slightly alkaline, for example by addition of ammonium hydroxide or sodium carbonate.

The emulsion of bromo-2-butadiene-1,3 may be polymerized readily even in the absence of the factors which accelerate the polymerization of bromo-2-butadiene-1,3, but light, elevated temperature and pressure, oxygen and oxidizing catalysts may be used where it is desired to increase the rate of polymerization or to vary the character of the product accordingly.

Retarding influences, such as inhibitors, as exemplified by catechol in Example II, may also be used to assist in controlling the polymerization and in modifying the properties of the final product. The ratio of bromo-2-butadiene-1,3 to water used in Example II may be varied considerably, larger proportions of the bromo-2-butadiene-1,3 giving viscous dispersions or non-fluid pastes. Other dispersing agents may be used in place of sodium oleate, for example sulfonated castor oil, triethanolamine oleate, and magnesium linoleate. The properties of the latex and of the products derived from it may be further varied by the addition of such modifying agents as proteins, for example albumin, and gums such as gum arabic.

The latex may be made to yield strong, elastic films as described above or may be coagulated, for example by the addition of dilute acetic acid to yield the solid polymer. The latex may also be used for other purposes for which natural latex is used, such as the impregnation of cloth, paper and other porous materials.

The polymers of bromo-2-butadiene-1,3 described above, irrespective of the method by which they are formed, are preferably stabilized against deterioration by aging by one or more of the methods to be described. Substances capable of prolonging the life of the polymers include ordinary rubber antioxidants, such as the aromatic amines, phenols, and the natural rubber antioxidants which may be extracted from various natural rubbers, for example by means of acetone. These function by inhibiting the oxidation of the polymers of bromo-2-butadine-1,3. In addition to these, a class of compounds known as acid acceptors, that is, basic substances or other substances capable of combining with acids, also act as preservatives for the synthetic rubber by combining with traces of acid which are formed in the polymers under certain conditions and which in the free state would cause deterioration. It will be seen that many of these preservatives also belong to other classes of substances used in the preparation of the polymers and may, therefore, serve a double purpose. Thus many of the antioxidants are also inhibitors of polymerization while many acid acceptors also function as stabilizers of the emulsions against spontaneous coagulation (sodium carbonate) or as pigments (zinc oxide) or as emulsifying agents (sodium oleate). These preserving agents may, in many cases, be added previous to the polymerization, or may be incorporated into the plastic polymers by milling, or may be dissolved or dispersed in the solutions of polymers, or may be applied to solid polymers in the form of a solution which is absorbed by the polymer, or may be dissolved or dispersed in the aqueous emulsions or dispersions of bromo-2-butadiene-1,3 or its polymers.

It will be seen from the above description, that bromo-2-butadiene-1,3 may readily be polymerized under a wide variety of conditions to yield useful products. The polymers obtained or their solutions or emulsions may be used to prepare shaped articles, films and protective coatings and to impregnate and/or coat porous or bibulous materials such as cloth or paper; and they are particularly valuable in connection with such uses when the peculiar advantages of high density, great toughness, or exceptional resistance to the action of solvents or chemical agents are desired.

The above description is to be construed as illustrative only and not as limiting the scope of the invention. The different features of the invention are capable of wide variations, and such changes as are within the spirit of the invention are comprehended by the scope of the claims.

We claim:

1. A polymer of bromo-2-butadiene-1,3.
2. A plastic polymer of bromo-2-butadiene-1,3, soluble in the usual rubber solvents.

3. An elastic, non-plastic polymer of bromo-2-butadiene-1,3.

4. A process which comprises polymerizing bromo-2-butadiene-1,3.

5. A process which comprises polymerizing bromo-2-butadiene-1,3 in the presence of an agent which increases the rate of polymerization.

6. A process which comprises polymerizing bromo-2-butadiene-1,3 in the presence of an agent which decreases the rate of polymerization.

7. A process which comprises polymerizing bromo-2-butadiene-1,3, in the presence of a solvent for the bromo-2-butadiene-1,3.

8. A process which comprises polymerizing bromo-2-butadiene-1,3 in the presence of a material which is a solvent for the bromo-2-butadiene-1,3 and for the polymers of bromo-2-butadiene-1,3.

9. A process which comprises polymerizing bromo-2-butadiene-1,3, and interrupting the polymerization before the product of polymerization has reached the insoluble, elastic stage.

10. A process which comprises polymerizing bromo-2-butadiene-1,3, and interrupting the polymerization before the product of polymerization has reached the insoluble, elastic stage, then separating the polymer from any unpolymerized bromo-2-butadiene-1,3.

11. A process which comprises polymerizing bromo-2-butadiene-1,3, and interrupting the polymerization before the product of polymerization has reached the insoluble, elastic stage, then separating the polymer from any unpolymerized bromo-2-butadiene-1,3 and further polymerizing the plastic polymer to the nonplastic state.

12. A coating composition comprising a polymer of bromo-2-butadiene-1,3 in a fluid state.

13. A shaped article comprising a polymer of bromo-2-butadiene-1,3.

14. An article coated with a polymer of bromo-2-butadiene-1,3.

15. An article impregnated with a polymer of bromo-2-butadiene-1,3.

16. A composition comprising essentially a polymer of bromo-2-butadiene-1,3 and a solvent for said polymer.

17. A composition comprising essentially a polymer of bromo-2-butadiene-1,3 and a pigment.

18. A composition comprising essentially a polymer of bromo-2-butadiene-1,3 and an antioxidant for said polymer.

19. A composition comprising essentially a polymer of bromo-2-butadiene-1,3 and an acid acceptor.

20. A composition comprising essentially a polymer of bromo-2-butadiene-1,3 and a member of the class consisting of compounding ingredients and antioxidants known in the rubber art, non-volatile solvents, diluents, and polymerization inhibitors.

WALLACE H. CAROTHERS.
ARNOLD M. COLLINS.